United States Patent

Davis et al.

[15] 3,647,041

[45] Mar. 7, 1972

[54] SYSTEM FOR DETERMINING LINE MEASURE

[72] Inventors: William H. Davis; Louis M. Hornung; Royce D. Lindsey; Howard C. Tanner, all of Austin, Tex.

[73] Assignee: International Business Machines Corporation, Armonk, N.Y.

[22] Filed: June 30, 1970

[21] Appl. No.: 51,087

[52] U.S. Cl. ............................................. 197/19, 197/84 A
[51] Int. Cl. ......................................................... B41j 5/30
[58] Field of Search ..................... 197/19, 20, 84, 84 A, 84 B, 197/187; 234/7

[56] References Cited

UNITED STATES PATENTS

| | | |
|---|---|---|
| 2,806,575 | 9/1957 | Higonnet et al. ...................... 197/84 A |
| 2,910,163 | 10/1959 | Hanson et al. .......................... 197/19 |
| Re. 25,354 | 3/1963 | Rossetto et al. ................... 197/84 A X |
| Re. 26,144 | 1/1967 | Robbins et al. ...................... 197/20 X |

*Primary Examiner*—Ernest T. Wright, Jr.
*Attorney*—Hanifin and Jancin and James H. Barksdale

[57] ABSTRACT

A system for determining and entering line measure into a justification computer for controlling the format of output copy. During an output operation when there is a necessity for determining line measure, a measure seek code is detected, escapement of the carrier initiated, the escapement of the carrier sensed, and the units of escapement counted. Upon sensing the location of the right margin stop, escapement is terminated. Thereafter the carrier is returned to the position occupied prior to the measure seek code being read. The number of units counted is the line measure which is then used for control of output.

7 Claims, 3 Drawing Figures

INVENTORS
WILLIAM H. DAVIS
LOUIS M. HORNUNG
ROYCE D. LINDSEY
HOWARD C. TANNER
ATTORNEY

SYSTEM FOR DETERMINING LINE MEASURE

BACKGROUND OF THE INVENTION

1. Field of the Invention

This invention relates to controlling formats for the graphic arts industry and general office secretarial use through the use of a justification system, and more particularly, to a system for determining line measure.

2. Description of the Prior Art

Heretofore, different modes of operation where handled in different ways, which involved among other things, elaborate coding, etc., which did not allow for using the margin stops of a typewriter to indicate the measure for justified output. With elaborate coding, changing from one mode of operation to another within a particular line depended upon the operator at the source recorder being capable of handling the coding, which is recorded on the input medium, and the output machine being capable of reading the coding and performing the desired functions. One of the most difficult problems for semiskilled operators has been coding to indicate the measure or to change the measure. This difficulty carries over to the entry of the measure on the output machine from a panel or the like. Reading the carrier position indicator by the operator for the purpose of entering this reading from a panel would not be effective, because the units of escapement are very small and the indicator is not discernible to an exact unit. The same can be said of the positioning of the margin stops.

SUMMARY OF THE INVENTION

Briefly, a system is provided for determining line measure when the necessity therefor arises. The margin stops are set to define the measure and the occurrence of a code starting the measure seek operation will start escapement of the carrier. The distance traveled by the carried to the right margin stop is noted, and this information is used in determining the measure for justification and other control of output.

The total system can be defined as one for determining and entering a line measure for controlling format in the production of output copy printed from data codes input to a justification computer and printer from a preprepared input medium, and having:

a. left and right margin stops which can be set at defined positions to define a line measure;

b. zone indicating and sensing means associated with the right margin stop for indicating when the carrier of the printer is between the possible position at which the right margin stop may be set immediately preceding the actual position of the right margin stop and the position at which the right margin stop is set;

c. means upon the occurrence of a measure seek code for causing the carrier to escape;

d. means for sensing and counting the number of units the carrier escapes;

e. means for sensing a multiple of the number of units the carrier escapes;

f. means for stopping the carrier after the carrier has passed the zone-indicating means and on the multiple which is correlated to and corresponds to the defined position where the right margin stop is set;

g. means for returning the carrier to the position occupied by it prior to the occurrence of the measure seek code; and h. means for registering the number of units the carrier escapes after occurrence of the measure seek code, and for entering this number into the justification computer.

It is an object of this invention to provide a simple and direct method of entering line length or measure in justification systems.

Another object of this invention is to eliminate the need for keying in information in justifying machines.

Another object of this invention is to reduce the need for elaborate format coding at a source recorder when a recorded tape is to be played out on an output unit such as a composer.

Yet another object of this invention is to eliminate the need for expensive and cumbersome switches or other entry devices from a justification computer.

Still another object of this invention is to provide an inexpensive system for determining line measure.

These and other objects and advantages will become more readily apparent when read in conjunction with the remainder of the specification and considered in connection with the accompanying drawing.

DESCRIPTION OF THE PREFERRED EMBODIMENT

Figure 1:
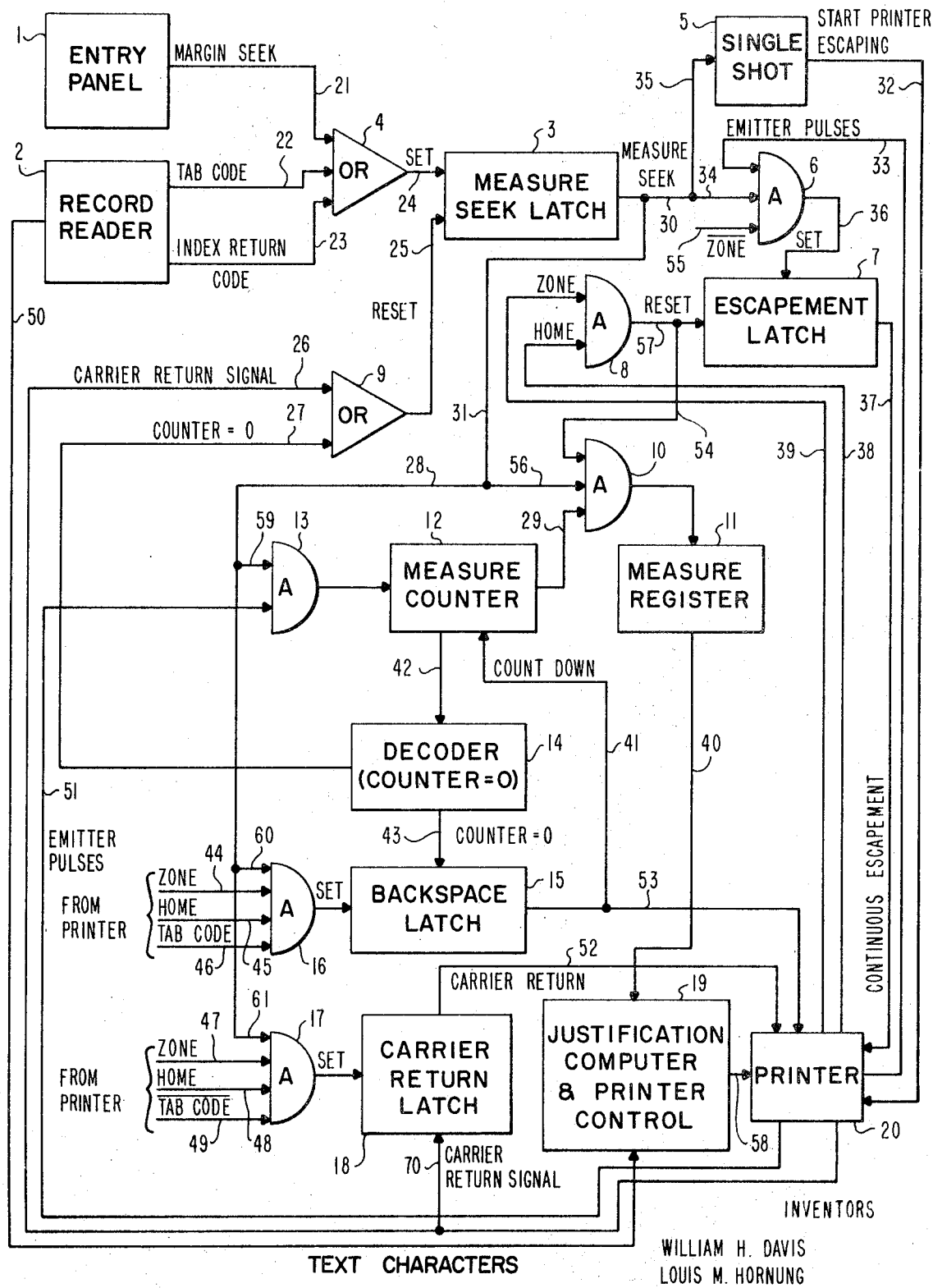
FIG. 1 is a block diagram of a system according to this invention.

In accordance with this invention, a system is provided for determining line measure.

Implementation of the entire system may take a number of forms, all well within the skill of the graphic and data-processing arts. The record reader 2, justification computer and printer control 19, and printer 20 used may be of the form of any conventional apparatus readily available, or may take the form described in U.S. Pat. No. 3,483,527. The entry panel 1 is merely an array of buttons which are used to start or initiate various functions.

The input medium or record carrying raw data may be prepared as a sequence of codes on a magnetic tape, etc., recorded by special typewriters available for this purpose or the record may be prepared by any suitable means. These input data codes which have been recorded are read by the record reader 2 under the influence and ultimate control of the justification computer and printer control 19.

The line measure which is to be determined according to this invention is herein defined to be a number of units or distance from the position of the carrier 86 to the right margin at the time a determination is made that this information is needed. For example, if the carrier 86 is at the left margin, the line measure would be the distance between the left and right margins. If the carrier 86 were positioned intermediate the left and right margins, as for example following the execution of a tabulation for line indention, the line measure would be less than the distance between the left and right margins. The reference heretofore to codes input to a justification computer 19 and printer 20 from a preprepared input medium applies to codes carried on such items as paper tapes, magnetic tapes, magnetic cards, punchcards, etc., and also may include codes or signals inputed by an operator by making panel entries.

Figure 2:
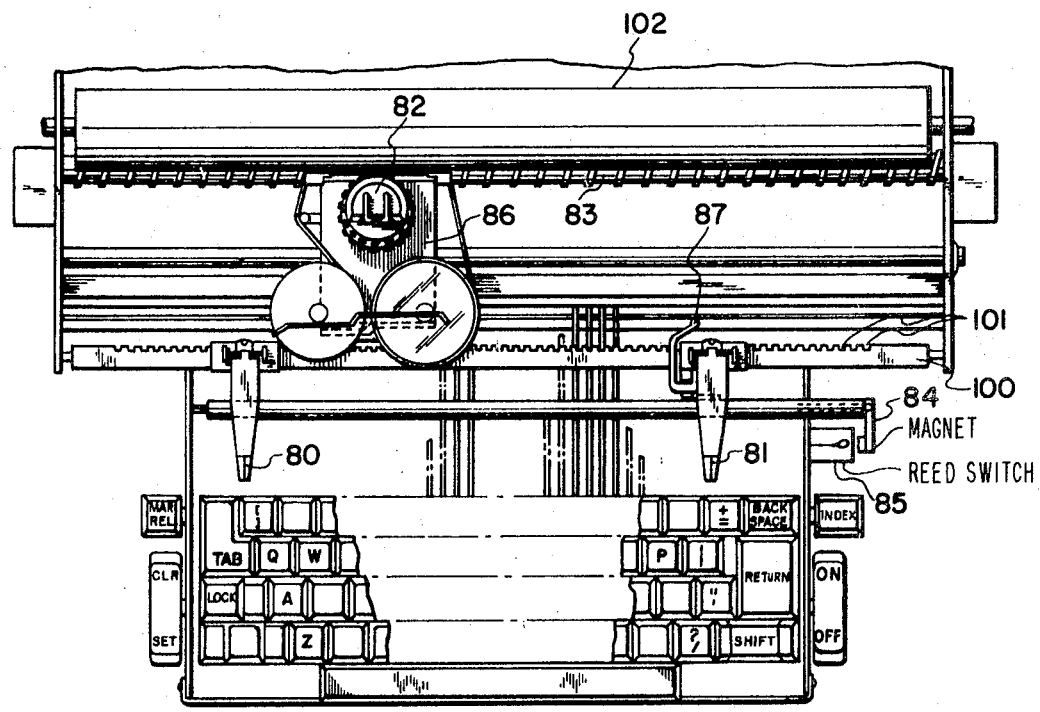
FIG. 2 is a plan view of a printer partially broken away, showing the margin stop means and right margin sensing means, which form a part of this invention.

Referring to FIG. 2, there is shown a conventional margin stop bar 100, which includes notches 101 into which the left and right margin set levers 80 and 81, respectively, are detachably mounted. The relative positions of the margin set levers 80 and 81 define a line measure for a line having no indention.

There are a number of instances where a measure seek operation is necessary, such as when the power is turned on; when the operator desires to change the measure; upon the occurrence of a new job start as indicated by an index return code; a change in line indention level as by changing the number of tabs to be executed before the output of the justified text, etc.

Figure 3:
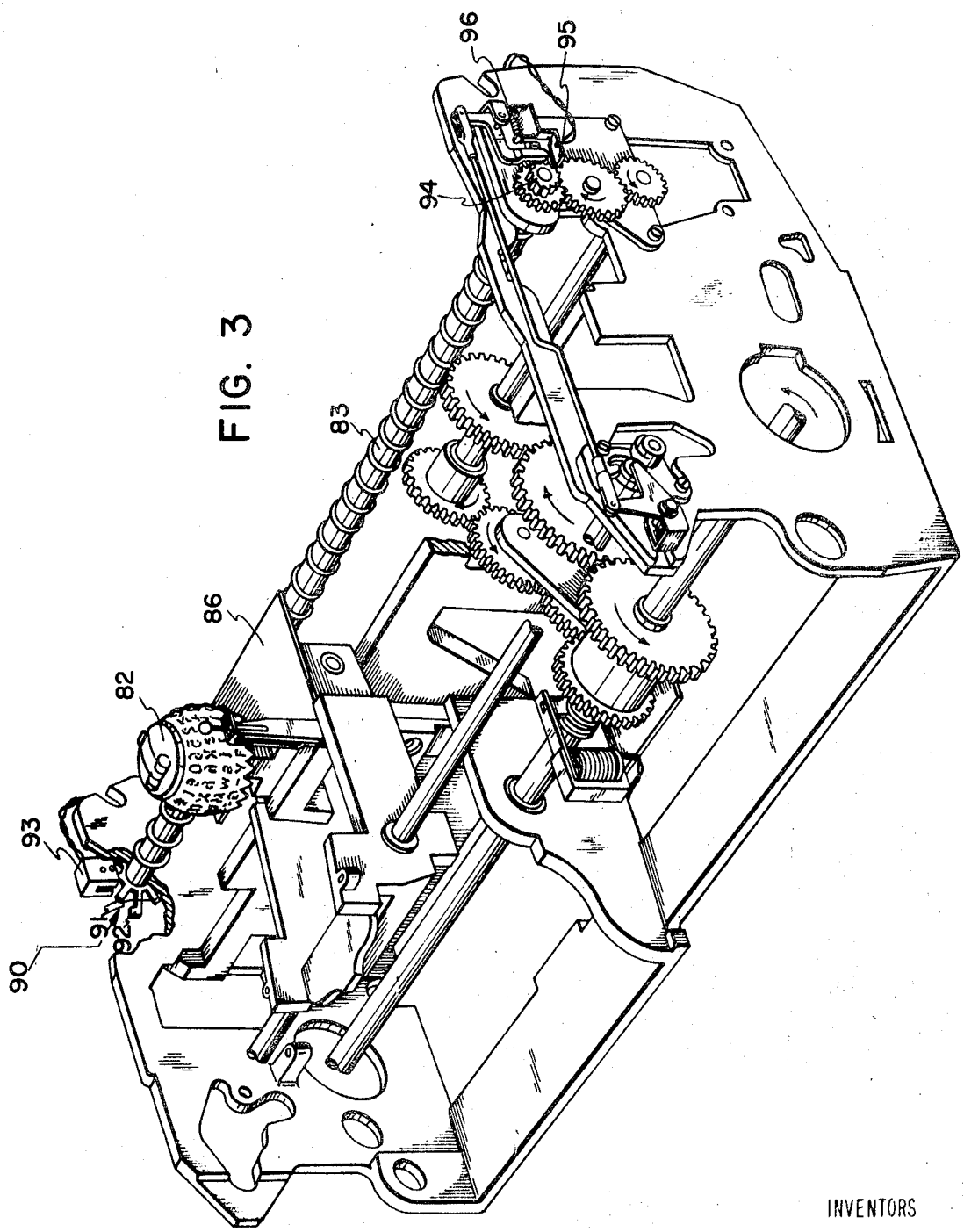
FIG. 3 is a perspective view showing a printer element, a carrier, escapement means, means for sensing each unit of escapement, and means for sensing multiples of escapement units of the carrier.

Referring to FIG. 3, rotation of lead screw 83 controlled by the rachet wheel 94, armature 95, and electrically controlled magnet 96, will result in escapement of the carrier 86, which is coupled to the lead screw 83, and will cause rotation of the emitter wheel, generally denoted by reference numeral 90.

The emitter wheel 90 includes a number of emitter spokes 91 which will produce emitter pulses corresponding to units of escapement, and a home emitter spoke 92 the sensing of which provides a multiple of the number of units the carrier 86 has escaped. Rotation of the emitter wheel 90 is sensed by photosensor 93, providing an output signal for each emitter spoke 91 as sensed, and an output home signal, hereinafter referred to as home, on each rotation of the emitter wheel 90 when the home emitter spoke 92 is sensed. An output home emitter pulse is produced at each possible location for positioning the right margin stop 81. The spacing of adjacent teeth 101 on margin stop bar 100 corresponds to the amount of escapement of carrier 86 associated with one revolution of lead screw 83. Connected to right margin stop 81 as shown in FIG. 2 is a carrier sensing member 87, which is used in determining whether the carrier 86 is in the "zone." The zone is the distance measured in units, from the position of the printer element 82 at the time of the next to last home emitter pulse produced by home emitter spoke 92. The zone is sensed by sensor 93, which is actuated when the carrier 86 is within the zone. Upon rotation of lead screw 83 and escapement of carrier 86, contact with carrier sensing member 87 will rotate magnet 84 to actuate reed switch 85, which causes carrier 86 to stop upon occurrence of the next home emitter pulse from sensor 93. This home emitter pulse corresponds to the exact position of the right margin stop 81. Carrier-sensing member 87 may alternately be an electrical contact which is actuated by contact with carrier 86.

The particular structural connection of the parts of the system set out above is considered well within the knowledge and capabilities of one skilled in the art.

With the foregoing serving as background for the remainder of the specification, reference is made to FIG. 1, wherein structure associated with entry panel 1, record reader 2, justification computer and printer control 19, and printer 20, is provided for determining the measure. With margin stops 80 and 81 being set, and an operator wanting to determine the measure, the measure seek operation is initiated by means of the operator making an entry in the entry panel 1. The output along line 21 through OR-circuit 4 sets measure seek latch 3 along line 24. The output of measure seek latch 3 is applied to lines 30 and 35 to single shot 5 causing a signal to be output along line 32 to printer 20 starting carrier escapement by energizing the cycle clutch magnet in the printer 20. Also, the output of measure seek latch 3 is applied to lines 31, 28, and 59 to AND-gate 13. Upon the beginning of carrier escapement, the emitter pulse output from printer 20 along line 33 is fed to AND-gate 6. Emitter pulse signals from printer 20 are applied along line 51 to AND-gate 13 for initiating counting in measure counter 12. The counter 12 advances once for each emitter pulse. The first emitter pulse applied along line 33 to AND-gate 6 will cause escapement latch 7 to be set by a signal from AND-gate 6 along line 36 if the signal from measure seek latch 3 along line 34 is up and the carrier 86 is not in the zone as indicated by the not zone signal applied along line 55, since all input conditions to AND-gate 6 are met. The output signal of the escapement latch 7 is applied along line 37 to printer 20 to cause escapement to continue by holding escapement magnet 96 picked.

As the carrier 86 continues escaping, an emitter pulse is generated from printer 20 for each unit of escapement which along line 51 and AND-gate 13 is input to measure counter 12 causing it to sequentially advance. When the zone is entered and a home emitter pulse is detected and a tab code has not occurred and these signals are applied along lines 47, 48, and 49, respectively, AND-gate 17, also receiving an input from measure seek latch 3 along line 61, sets carrier return latch 18. Latch 18 outputs a carrier return signal along line 52 to printer 20, which initiates a carrier return operation without vertical indexing of the platen 102. The occurrence of a home and zone signal along lines 38 and 39 to AND-gate 8 will reset escapement latch 7 along line 57. The output of AND-gate 8 along line 54 provides one input into AND-gate 10, which derives the remainder of its inputs from measure seek latch 3 along line 56 and measure counter 12 along line 29. AND-gate 10 symbolically represents a multitude of AND gates, one for each binary digit of the measure counter 12. The output of AND-gate 10 is fed to measure register 11, into which the contents of the measure counter 12 are transferred and which in turn are fed to justification computer and printer control 19 along line 40, for control of format following the completion of the measure seek operation. Upon execution of a carrier return, carrier return latch 18 is reset along line 70. This signal is also applied to OR-gate 9 along line 26 and then along line 25 to measure seek latch 3 which causes measure seek latch 3 to reset and the measure seek operation to terminate.

In the instance where a measure seek operation is indicated upon the occurrence of a tab code applied along line 22 from record reader 2, the carrier 86 will not be at the left margin after execution of the tab code and therefor return of the carrier 86 to the left margin following the measure seek operation would not be the desired function. Therefore, after transfer of the contents of the measure counter 12 to the measure register 11, a backspace operation to position the carrier 86 in a position occupied by the carrier 86 prior to the measure seek operation is initiated. An indication from the printer 20 of zone along line 44, home along line 45, tab code along line 46, and a signal from measure seek latch 3 along line 60 is, fed into AND-gate 16 to set backspace latch 15. The output of the backspace latch 15 along line 53 causes carrier 86 of printer 20 to be backspaced, and along line 41 causes the counter 12 to count in the reverse sequence from that counted as the carrier 86 escaped in the forward direction upon occurrence of input signals from AND-gate 13. As the carrier 86 is backspaced, the lead screw 83 is rotated in the reverse direction and emitter pulses are input to AND-gate 13 from the printer 20 along line 51, and the contents of measure counter 12 are reduced to zero when the carrier 86 reaches the position occupied prior to the measure seek operation. Signals from the counter 12 are applied along line 42 to decoder 14 which produces an output when the counter 12 reaches the zero state. This output from the decoder 14 is transferred along line 43 resetting backspace latch 15, and along line 27 to OR-circuit 9 resetting measure seek latch 3 indicating the end of the operation.

Another instance calling for a measure seek operation would be upon the occurrence of an index return code, which generally denotes a new document, read by record reader 2 an applied along line 23. In this instance, a carrier return situation is presented after execution of which a measure seek operation is initiated in accordance with the foregoing description. The means for executing the initial carrier return is not illustrated in FIG. 1, as it is a normal function of the system which is separate from the measure seek means which is shown.

Codes read by record reader 2 are applied along line 50 to justification computer and printer control 19 and then along line 58 for controlling printer 20.

Detailed circuitry appropriate to the blocks in the system in FIG. 1 is not presented since such details are sufficiently known to those practicing in this and allied arts, especially those relating to the electronic computers and processors. For example, the various latches depicted may be static flip-flops, while measure counter 12 can be a simple binary counter with reversing capability which retains its count while the reversing signal is changed. Such a counter is shown in U.S. Pat. No. 3,114,883. Single shot 5 is shown in U.S. Pat. No. 3,513,226 and decoder 14 can be combinational logic as taught in standard texts.

The term measure as used herein is intended to encompass not only classical line measure, i.e., the total line length but also includes the length of a column of tabular material and other length determinations such as determining residue or line remainder.

While the invention has been particularly shown and described with reference to a preferred embodiment, it will be understood by those skilled in the art that various changes in form and detail may be made without departing from the spirit and scope of the invention.

What is claimed is:

1. A system for determining and entering a line measure for controlling format in the production of output copy printed from data codes input to a justification computer and printer having a carrier, said system comprising:
   means for defining left and right margins,
   means for generating a measure seek signal,
   means for causing said carrier of said printer to move to the said right margin upon the occurrence of said measure seek signal,
   means for counting the number of units of travel said carrier moves through from the position occupied by it at the time of generation of said measure seek signal to said right margin, and
   means for entering said count into said justification computer.

2. The system of claim 1 further including means for causing said carrier to return to said position occupied by it at the time of said measure seek signal after said carrier has moved to said right margin.

3. The system of claim 2 wherein said means for counting is a reversible counter which is incremented as said carrier moves to said right margin.

4. The system of claim 3 wherein said means for causing said carrier to return to said position occupied by it prior to the occurrence of a measure seek signal includes backspace means which backspace said carrier and subtract units from said counter until said count in said counter is zero.

5. The system of claim 3 wherein said means for returning said carrier further includes a carrier return means for returning said carrier to said left margin.

6. The system of claim 5 wherein said means for defining left and right margins are margin stop means which can be set to defined positions to define a line measure.

7. The system of claim 6 further including zone-indicating means associated with said right margin stop means for indicating when said carrier of said printer is between the possible right margin set position prior to the actual position at which the right margin is set and the position at which said right margin stop means is set,
   means for sensing a multiple of the number of units said carrier has escaped, and
   means for stopping said carrier after it has passed said zone indicating means and on the multiple which is correlated to and corresponds to the defined position where said right margin stop means is set.

* * * * *